United States Patent [19]

Boatwright et al.

[11] Patent Number: 4,837,419
[45] Date of Patent: Jun. 6, 1989

[54] FUEL ROD END PLUG WELDING APPARATUS AND METHOD

[75] Inventors: David A. Boatwright, Columbia; Robert Duncan, Fork Township, Lexington County; Kenneth K. Klapper, Columbia, all of S.C.

[73] Assignee: Westinghouse Electric Corp., Pittsburgh, Pa.

[21] Appl. No.: 201,145

[22] Filed: Jun. 2, 1988

[51] Int. Cl.⁴ ............................................ B23K 9/225
[52] U.S. Cl. .............................. 219/125.11; 219/60 R; 219/61; 219/136
[58] Field of Search ...................... 219/60 R, 61, 60 A, 219/136, 137 R, 125.11

[56] References Cited

U.S. PATENT DOCUMENTS

| | | | |
|---|---|---|---|
| 3,068,343 | 12/1962 | Rössner | 219/60 R |
| 3,188,446 | 6/1965 | Ray et al. | 219/60 R |
| 3,683,148 | 8/1972 | Boyko et al. | 219/137 R |
| 3,725,635 | 4/1973 | Fink et al. | 219/121 P |
| 3,774,010 | 11/1973 | Heer et al. | 219/121 LM |
| 3,828,518 | 3/1974 | Silk et al. | 53/12 |
| 3,842,238 | 10/1974 | Boyko et al. | 219/137 R |
| 4,075,454 | 2/1978 | Duncan et al. | 219/137 R |
| 4,188,521 | 2/1980 | Yeo | 219/60 A |
| 4,480,171 | 10/1984 | Christiansen | 219/136 |
| 4,511,075 | 4/1985 | Yeo | 228/7 |
| 4,570,051 | 2/1986 | Miwa | 219/137 R |

FOREIGN PATENT DOCUMENTS

0896826 5/1962 United Kingdom .

Primary Examiner—Clifford C. Shaw

[57] ABSTRACT

A welding apparatus has a welding chamber with an access opening allowing passage of a cladding tube end fitted with an end plug to a welding position therein. A rotatable end plug stop assembly disposed in the chamber and axially aligned with the access opening is adapted to engage the end plug when inserted in the welding chamber. An end of a electrode of a girth welding assembly disposed in the welding chamber adjacent to the rotatable end plug and tube end and in generally orthogonal relation thereto is operable to form a girth weld circumferentially joining the end plug and cladding tube end. An end seal welding assembly mounted to the end plug stop assembly and having an electrode with an end disposed adjacent to and in axial alignment with an axial bore of the end plug is operable to form an end seal weld therein. The end seal welding assembly also defines a path for flow of a fill gas along the electrode and both into the welding chamber and the end plug axial bore before formation of the end seal weld therein. The end plug stop assembly includes an end stop which receives an end seal welding electrode and flow of fill gas along the electrode, and an end plug-engaging insert adapted to fit in the end stop and engage the end plug leading end portion.

21 Claims, 5 Drawing Sheets

FUEL ROD END PLUG WELDING APPARATUS AND METHOD

CROSS REFERENCE TO RELATED APPLICATIONS

Reference is hereby made to the following copending applications dealing with related subject matter and assigned to the assignee of the present invention:

1. "Pressurized Weld Chamber" by D. Yeo et al, assigned U.S. Ser. No. 137,623 and filed Dec. 24, 1987.
2. "Burnable Absorber Rod End Plug Welding Apparatus And Method" by Anthony Boatwright, assigned U.S. Ser. No. 201,224 and filed 6/2/88.

BACKGROUND OF THE INVENTION

1. Field of the Invention

The present invention relates generally to nuclear fuel rod manufacture and, more particularly, is concerned with apparatus and method for welding an end plug on a nuclear fuel rod cladding tube.

2. Description of the Prior Art

A nuclear reactor core is composed of a multiplicity of fuel assemblies with each fuel assembly comprised of a plurality of nuclear fuel rods. Conventional operations performed at various stages in the manufacture of nuclear fuel rods are disclosed in a British Patent Specification No. to Foster (896,826) and in U.S. patents to Boyko et al (U.S. Pat. No. 3,683,148), Fink et al (U.S. Pat. No. 3,725,635), Heer et al (U.S. Pat. No. 3,774,010), Silk et al (U.S. Pat. No. 3,828,518), Duncan et al (U.S. Pat. No. 4,075,454), Yeo (U.S. Pat. Nos. 4,188,521 and 4,511,075), Christiansen et al (U.S. Pat. No. 4,480,171) and Miwa (U.S. Pat. No. 4,570,051).

According to one conventional method, a typical nuclear fuel rod is manufactured by loading a plurality of nuclear fuel pellets and a plenum spring into a cladding tube and applying bottom and top end plugs to opposite ends of the cladding tube. Typically, the bottom end plug is girth welded to one end of the tube at one welding station and then the tube is moved to a separate welding station where the top end plug is girth welded to the opposite end of the tube.

At each girth welding station, the respective tube end fitted with th corresponding end plug is inserted into a welding position in a welding chamber of a housing where the end plug engages a rotatable stop member and a circumferential seam or interface formed by the respective abutting shoulder of the end plug and end of the tube lies directly beneath a stationary welding electrode oriented orthogonally to the axis of the tube.

To obtain girth welding of the end plug in the tube, the tube and end plug and the stop member engaged therewith are rotated relative to the stationary electrode. Concurrently with the rotation, electric power is supplied to the stationary electrode, generating an arc which forms the girth weld at the circumferential interface of the end plug and cladding tube.

Ordinarily, the top end plug also contains an axial passage or bore. At still another separate station, a seal weld will be formed to close the axial bore of the top end plug to complete manufacture of the fuel rod. However, before formation of the seal weld, a vacuum is drawn through the end plug bore via a hole in a stop member engaged with the end plug. The vacuum evacuates undesired air and other contaminant gases from the plugged tube. This is followed by pressurized filling of the tube with an inert fill gas, such as helium, through the stop member hole and end plug axial bore. After that, an axial electrode is used to form the end seal weld to close the top end plug axial bore.

The above-described conventional fuel rod manufacturing method has several drawbacks. First of all, it uses separate welding stations for formation of each of the three welds. This requires duplication of expensive equipment and thus higher capital costs. Second, in each separate station, the welding chamber is flooded with inert gas to purge unwanted gases therefrom before the welding operation is carried out. This is highly wasteful of inert gas supplies. Finally, employment of separate welding stations makes the overall steps in carrying out fuel rod manufacturing more time consuming and cumbersome.

Consequently, a need exists for improvements which will eliminate or reduce the aforementioned drawbacks and enhance the efficiency of fuel rod manufacture.

SUMMARY OF THE INVENTION

The present invention provides a fuel rod end plug welding apparatus and method designed to satisfy the aforementioned needs. The welding apparatus of the present invention includes improvements relating to formation of girth and seal welds on the top end plug. In particular, after the bottom end plug has been girth welded to the bottom end of the cladding tube, a similar type of welding chamber is employed to carry out girth and seal welding of the top end plug. An improved end plug stop assembly is provided to facilitate performance of girth and seal welding in the same welding chamber.

As a result of using the improved welding apparatus, weld cycle time will be greatly reduced, less inert gas will be used, and the fill gas used to pressurize the tube precedent to seal welding can also be used to chill the previously formed girth weld. Also, chamber atmosphere will be lower in oxygen and, if seal welding is done while the tube is rotating, the melt zone will tend to be more central.

Accordingly, the present invention is directed to an apparatus for welding an axial bore-bearing end plug on an end of a cladding tube wherein the apparatus comprises: (a) a stationary housing defining a welding chamber and an access opening at one end of the chamber to allow passage of the tube end fitted with the end plug therethrough to and from a welding position within the chamber; (b) an end plug stop assembly rotatably mounted to the housing and disposed in the chamber opposite from and axially aligned with the chamber access opening, the stop assembly being adapted to engage a leading end portion of th end plug when inserted in the welding chamber; (c) a girth welding assembly mounted on the housing and having an electrode with a leading end portion disposed within the welding chamber adjacent to the end plug and tube end and extending in generally orthogonal relation to the tube, the electrode being operable to form a girth weld circumferentially joining the end plug and end of the cladding tube; (d) an end seal welding assembly mounted to the end plug stop assembly and having an electrode with a leading end portion disposed therethrough to a position located adjacent to and in axial alignment with the axial bore of the end plug, the electrode being operable to form an end seal weld therein, the end seal welding assembly also having means defining a path for flow of a fill gas along the electrode and both into the welding chamber and into the axial bore of the end plug before formation of the end seal weld therein; and (e) drive means being operable to rotate the tube and thereby rotate the tube end and end plug within the welding chamber and therewith the end plug stop assembly which supports the end plug.

The present invention is also directed to the end plug stop assembly used in the above-defined welding apparatus. The stop assembly comprises: (a) an end stop configured to receive the end seal welding electrode through its rear portion and a flow of fill gas along the electrode through its rear portion; and (b) an end plug-engaging insert adapted to be removably received in a forward portion of the end stop, the insert being configured to receive the end plug leading end portion at a front portion of the insert and the end seal welding electrode leading end portion through a rear portion of the insert into the position for forming the end seal weld in the axial bore of the end plug when the latter is received in the forward portion of the insert, the insert also being configured to receive the flow of fill gas from the end stop into the rear and forward portions of the insert along and past the end seal welding electrode leading end portion for filling the welding chamber and the cladding tube through the axial bore of the end plug prior to formation of the end seal therein.

More particularly, the end stop of the stop assembly has at its forward portion a forward cylindrical cavity open at a front end, at its rear portion a rear central passage open at a rear end, and at a middle portion located between its forward and rear portions a middle orifice which at its respective rear and front opposite ends communicates respectively with a front end of the rear passage and a rear end of the forward cavity. The insert of the stop assembly is sized to frictionally fit within the forward cavity of the end stop. The insert has at its forward portion a forward recess open at a front end and configured to receive the leading end portion of the end plug therein and a plurality of spaced apart forward grooves open at their front ends and extending along and opening into the forward recess and extending past the end plug leading end portion when received in the forward recess, at its rear portion a rear axial channel open at a rear end and a plurality of rear passageways open at their rear ends and being spaced circumferentially from one another and offset radially from and extending along the rear axial channel, and at an intermediate portion located between its forward and rear portions an intermediate chamber which at its respective rear and front opposite ends communicates respectively with front ends of the rear channel and passageways and rear ends of the forward recess and grooves, the intermediate chamber being smaller in diameter than the maximum diameter of the forward recess and larger in diameter than each of the rear channel and passageways.

The end stop of the stop assembly with such configuration is thereby adapted to receive the end seal welding electrode through its rear passage with the electrode leading end portion extending through and forwardly of the middle orifice of the end stop into the position for forming the end seal weld in the axial bore of the end plug when the latter is received in the forward recess of the insert. The end stop is thereby also adapted to receive the flow of fill gas through its rear passage along the end seal welding electrode and into its middle orifice for filling the welding chamber and the cladding tube through the axial bore of the end plug prior to formation of the end seal therein.

The insert of the stop assembly with such configuration is thereby adapted to receive the end seal welding electrode leading end portion through its rear channel and extending therefrom into its intermediate chamber to the position adjacent to but spaced from the axial bore of the end plug when received in the forward recess of the insert. The insert is thereby also adapted to receive the flow of fill gas into its offset rear passageways from the middle orifice of the end stop for supplying the fill gas flow to its intermediate chamber past the leading electrode end and both into the end plug axial bore and outwardly through the grooves in the insert past the end plug to the welding chamber.

The present invention is further directed to a method of welding an axial bore-bearing end plug on an end of a cladding tube, wherein the method comprises the steps of: (a) inserting the end of the cladding tube with the end plug fitted thereon through an access opening in a housing and into a welding position in a welding chamber of the housing adjacent to a leading end portion of a girth welding electrode mounted on the housing and extending in generally orthogonal relation to the tube end and end plug; (b) placing the end plug in supporting contact with a rotatable stop assembly disposed in the chamber opposite from and axially aligned with the chamber access opening, mounting a leading end portion of an end seal welding electrode and defining pathways for flow of inert gas for filling the welding chamber and the cladding tube via the axial bore in the end plug; (c) rotating the tube and thereby the tube end and end plug within the welding chamber and therewith the stop assembly engaged with the end plug; (d) operating the girth welding electrode to form a girth weld circumferentially joining the end plug and end of the cladding tube; (e) introducing the flow of inert gas via the stop assembly into the end plug axial bore and into the welding chamber to pressurize the chamber and thereby the interior of the cladding tube; and (f) after the chamber and cladding tube interior have been pressurized with inert gas, operating the end seal welding electrode to form an end seal weld in the end plug axial bore to close the same.

These and other advantages and attainments of the present invention will become apparent to those skilled in the art upon a reading of the following detailed description when taken in conjunction with the drawings.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 1:
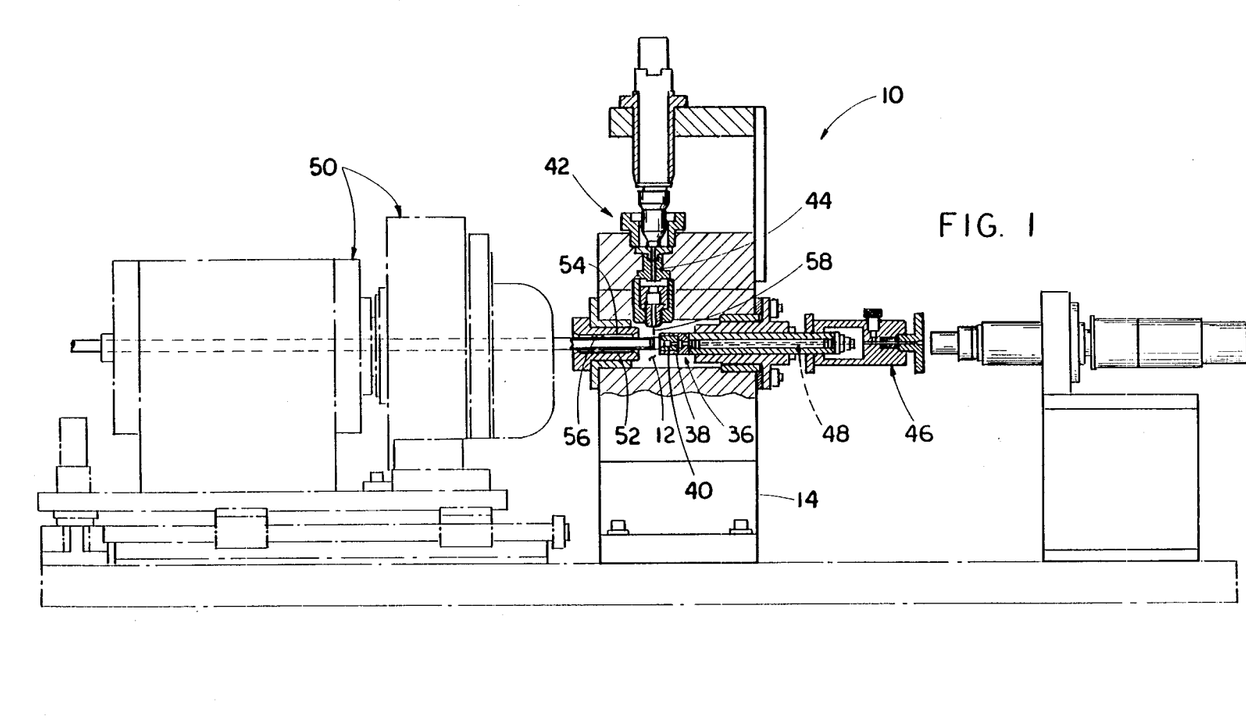
FIG. 1 is a side elevational view, partly in axial section, of a welding apparatus constructed in accordance with the principles of the present invention.
Figure 10:
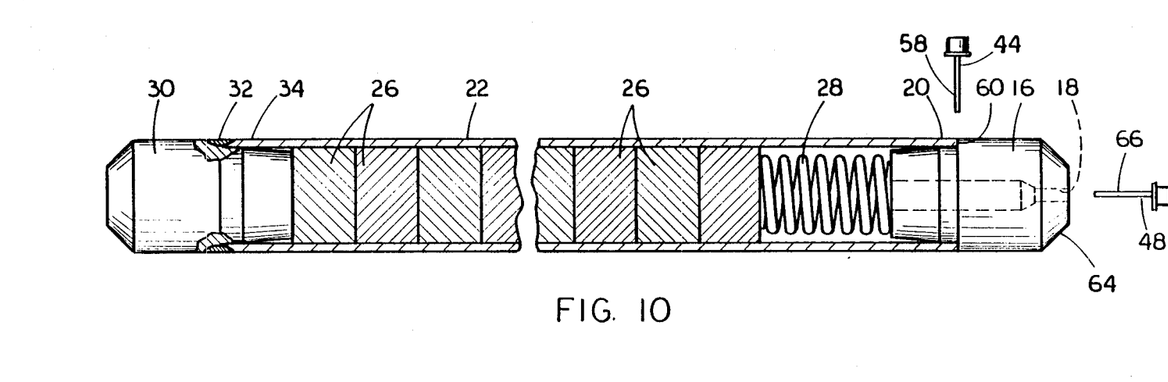
FIG. 10 is an enlarged, longitudinally foreshortened, axial sectional view of fuel rod, also schematically depicting the positions of electrodes of the welding apparatus for girth and end seal welding of the top end plug on the fuel rod tube.

Referring now to the drawings, and particularly to FIG. 1, there is illustrated a welding apparatus, generally designated by the numeral 10 and constituting the preferred embodiment of the present invention. The welding apparatus 10, although not so limited, is adapted particularly for both girth and end seal welding, in the same welding chamber 12 defined by a housing 14 of the apparatus 10, a top end plug 16 having an axial bore 18 on a top end 20 of a cladding tube 22 in the final stages of manufacturing a nuclear fuel rod 24, as shown in FIG. 10. The welding of the top end plug 16 occurs after the cladding tube 22 has been loaded with a stack of nuclear fuel pellets 26 and a plenum spring 28, and a bottom end plug 30 has been girth welded at 32 to a bottom end 34 of the cladding tube 22.

In addition to the stationary housing 14 defining the welding chamber 12, the welding apparatus 10 basically includes an elongated rotatable stop assembly 36 having an end stop 38 and an end plug-engaging insert 40, a girth welding assembly 42 having an elongated electrode 44, an end seal welding assembly 46 having an elongated electrode 48, and a drive mechanism 50, such as a rotatably driven chuck, for receiving, engaging and rotating the cladding tube 22. The girth welding assembly 42 and its electrode 44, the end seal welding assembly 46 and its electrode 48, and the drive mechanism 50 are conventional and well known per se in their constructions and modes of operation; therefore, they need not be illustrated in detail herein for gaining a clear and complete understanding of the present invention. The improvements provided in the welding apparatus 10 of the present invention relate primarily to the construction and function of the stop assembly 36 and the arrangement of the girth and end seal welding assemblies 42,46 in the same welding apparatus and sharing a common welding chamber.

Figure 3:
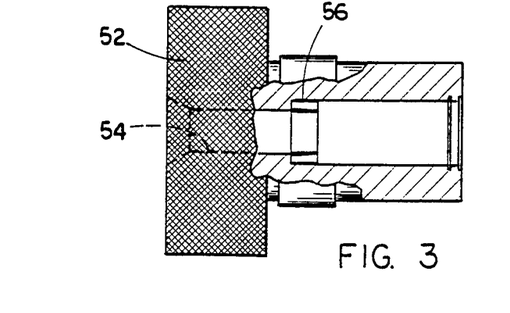
FIG. 3 is an enlarged side elevational view, partly in axial section, of a fuel rod tube guide bushing and cup seal of the welding apparatus of FIG. 1.
Figure 4:
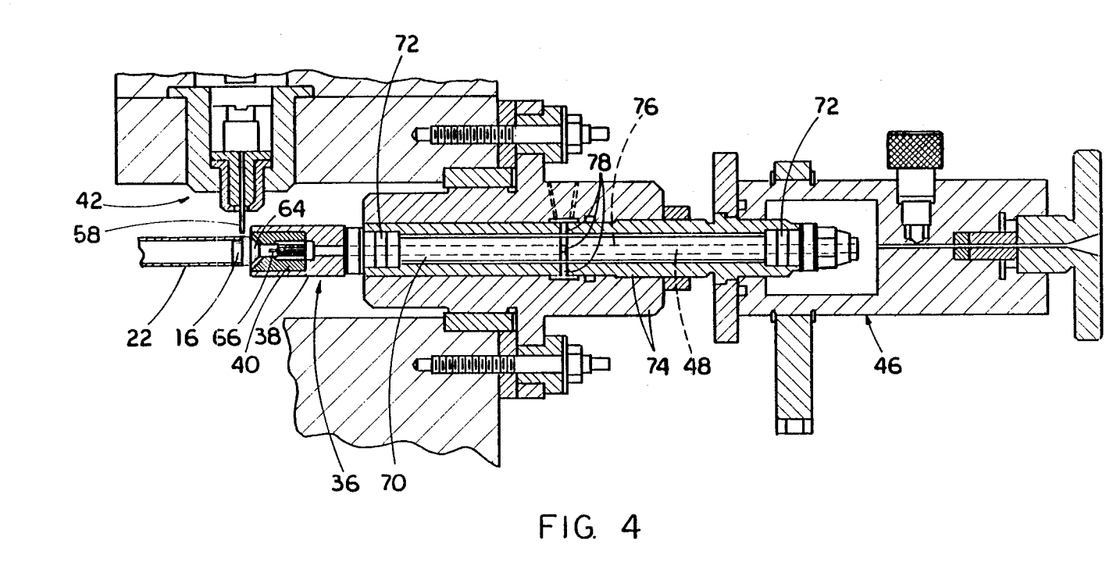
FIG. 4 is an enlarged axial sectional view of the end plug stop assembly, of a leading end of the girth welding assembly, and of the end seal welding assembly of the welding apparatus of FIG. 1, with a cladding tube end fitted with an end plug being engaged with the stop assembly insert.

More particularly, in addition to the welding chamber 12, the housing 14 of the welding apparatus 10 incorporates a bushing 52 which defines an access opening 54 at one end of the welding chamber 12 to allow passage of the top tube end 20 fitted with the top end plug 16 into and from a welding position within the chamber. The access opening 54 is larger in diameter size than both the cladding tube 22 and the end plug 16 which both have the same outside diameter. As seen in FIG. 3, an annular resiliently yieldable cup seal 56 is disposed in the access opening 54 for allowing inserting of the cladding tube 22 therethrough but maintaining a contacting sealing relation therewith for sealing the welding chamber 12.

Figure 2:
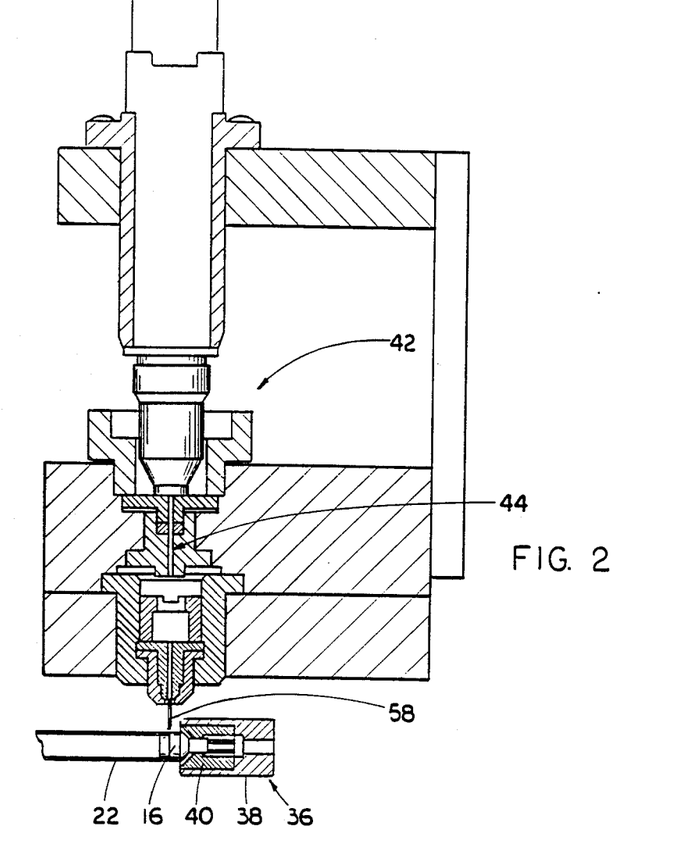
FIG. 2 is an enlarged axial sectional view, partly in elevation, of a girth welding assembly, of an end stop and end plug-engaging insert of an end plug stop assembly, and of a leading end portion of the end seal welding assembly of the welding apparatus of FIG. 1, with a cladding tube end fitted with an end plug being engaged with the stop assembly insert.

FIG. 2 in addition to FIG. 1 illustrates the girth welding assembly 42 of the welding apparatus 10 mounted on the housing 14 with its electrode 44 extending in generally orthogonal relation to the cladding tube 22 with the latter inserted at the welding position in the welding chamber 12. A leading end portion 58 of the girth welding electrode 44 is disposed within the welding chamber 12 adjacent to an interface formed between the top end 20 of the cladding tube 22 and a circumferential shoulder 60 on the top end plug 16. The electrode 44 is operable in a known manner to form a girth weld 62 (FIG. 11) circumferentially joining the end plug 16 and the cladding tube end 20 at the region of the interface.

Turning now to FIGS. 4 to 9, there is shown the end plug stop assembly 36 rotatably mounted to the housing 14 with its end stop 38 disposed in the welding chamber 12 opposite from and axially aligned with the chamber access opening 54. The insert 40 of the stop assembly 36 frictionally fitted in the end stop 38 engages and supports a leading end portion 64 of the top end plug 16 after the latter is inserted into the welding position within the welding chamber 12. Further, the end seal welding assembly 46 is mounted to the stop assembly 36 with its electrode 48 axially extending therethrough. A leading end portion 66 of the end seal welding electrode 48 is disposed at a position located adjacent to and in axial alignment with the axial bore 18 of the top end plug 16. The end seal welding electrode 48 is operable in a known manner to form an end seal weld 68 (FIG. 11) in the end plug axial bore 18 to sealably close the same. As will be explained hereafter, means are also provided in the stop assembly 36 associated with the end seal welding assembly 46 for defining a path for flow of a fill gas from a manifold (not shown) along the end seal welding electrode 48 and both into the welding chamber 12 and into the axial bore 18 of the end plug 16 before formation of the end seal weld 68 therein.

More particularly, in addition to the end stop 38 and the end plug-engaging insert 40, the stop assembly 36 includes an elongated support member 70 which has the end stop 38 fixed on the forward end thereof for rotation therewith. The support member 70 extends through, and is rotatably mounted by spaced bearings 72 to, a tubular casing 74 incorporated by the housing 14. The support member 70 is hollow so as to define a central channel 76 extending through it for both receiving the end seal welding electrode 48 and a flow of inert fill gas entering through a set of radial openings 78 therein which communicate with the central channel 76.

The end stop 38 of the end plug stop assembly 36 is configured to receive a forward portion of the end seal welding electrode 48 through a rear portion thereof and the flow of fill gas along the electrode 48 through the end stop rear portion. In particular, preferably, the end stop 38 has at its forward portion a forward cylindrical cavity 80 open at a front end, and at its rear portion a rear central passage 82 open at a rear end and communicating with the central channel 76 through the support member 70. At a middle portion located between its forward and rear portions, the end stop 38 has a middle orifice 84 which at respective rear and front opposite ends communicates respectively with a front end of the rear passage 82 and a rear end of the forward cavity 80.

The end plug-engaging insert 40 of the stop assembly 36 is adapted to be removably received in the forward cavity 80 of the end stop 38. Specifically, the insert 40 is cylindrical shaped and preferably composed of a nonconductive ceramic material. The insert 40 has a diametric size slightly less that the diametric size of the forward cavity 80 of the end stop 38 adapting the insert 40 to tightly frictionally fit within the end stop cavity.

Also, the insert 40 is configured at its forward portion to have a forward recess 86 in the shape of a truncated cone open at a front end to receive a complementarily shaped leading end portion of the end plug 16 therein. Further, the insert 40 at its forward portion has a plurality of spaced apart forward grooves 88 open at their front ends and extending along and opening into the forward recess 86 and extending past the end plug leading end portion when received in the forward recess.

Further, the insert 40 is configured at its rear portion to have a rear axial channel 90 open at a rear end and a plurality of rear passageways 92 open at their rear ends and being spaced circumferentially from one another and offset radially from and extending generally parallel to and along the rear axial channel 90. At an intermediate portion located between its forward and rear portions, the insert 40 has an intermediate chamber 94 which at respective rear and front opposite ends communicates respectively with front ends of the rear channel 90 and rear passageways 92 and rear ends of the forward recess 86 and forward grooves 88. The intermediate chamber 94 of the insert 40 is smaller in diameter than the maximum diameter of conical forward recess 86 and larger in diameter than each of the rear channel and passageways 90,92.

Figures 5, 7:
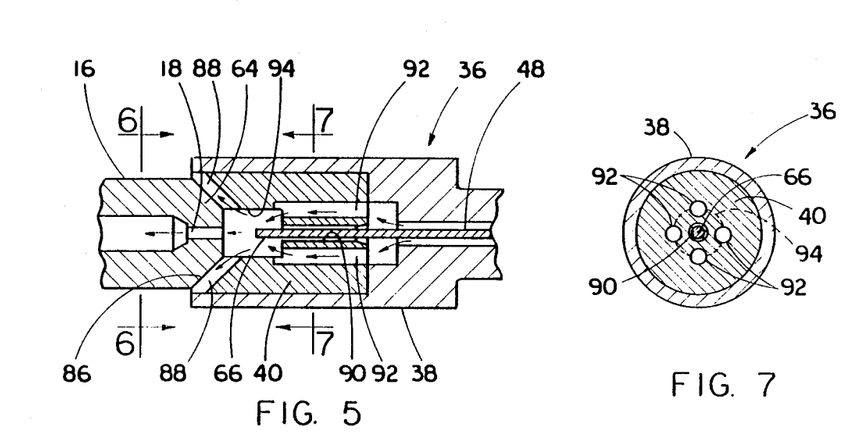
FIG. 5 is an enlarged fragmentary axial sectional view of the end plug stop assembly of FIG. 4, showing an end stop and the insert thereof along with a leading end portion of the end plug and the leading end portion of the end seal welding electrode.
FIG. 7 is a cross sectional view of the end stop assembly and end seal electrode leading end portion taken along line 7—7 of FIG. 5.
Figure 6:
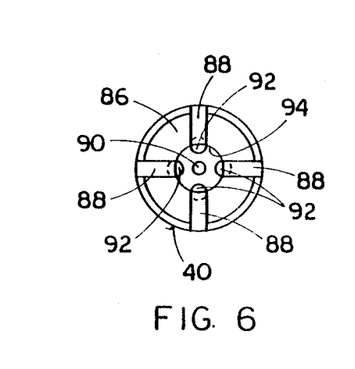
FIG. 6 is a front elevational view of the insert of the end stop assembly as seen along line 6—6 of FIG. 5, with the end plug and end stop omitted.
Figure 8:
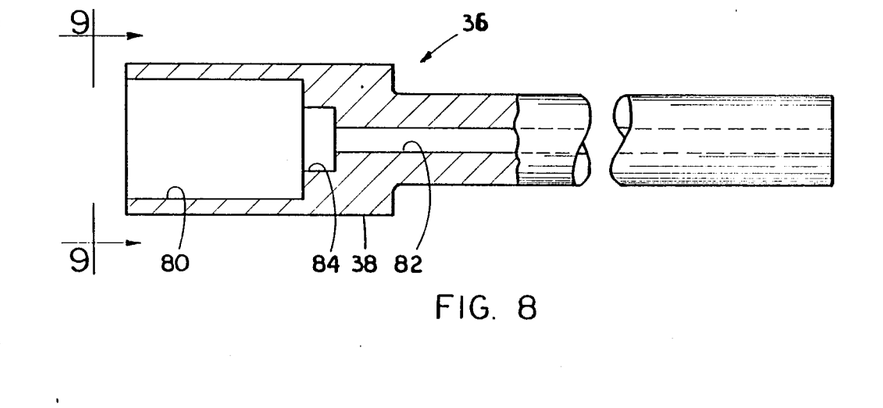
FIG. 8 is an enlarged view of the end stop of the end plug stop assembly of FIG. 4.
Figure 9:
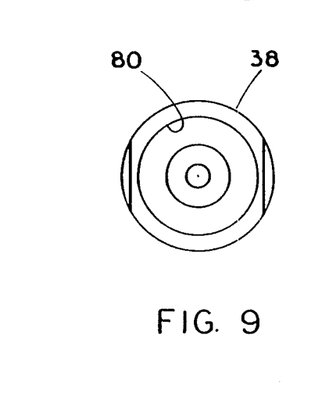
FIG. 9 is a front elevational view of the end stop as seen along line 9—9 of FIG. 8.

In view of the above-described configuration, as can be seen particularly in FIG. 5, the end stop 38 of the stop assembly 36 is thereby adapted to receive the end seal welding electrode 48 through the rear passage 82 thereof with the electrode leading end portion 66 extending through and forwardly of the middle orifice 84 of the end stop 38 into the position for forming the end seal weld 68 (FIG. 11) in the axial bore 18 of the end plug 16 with the latter received in the forward recess 86 of the insert 40. Also, the end stop 38 is thereby adapted to receive the flow of fill gas through the rear passage 82 thereof along the end seal welding electrode 48 and into the middle orifice 84 of the end stop 38, as indicated by the respective arrows therein, for filling the welding chamber 12 and the cladding tube 22 through the axial bore 18 of the end plug 16 prior to formation of the end seal 68 therein. With such configuration, the insert 40 of the stop assembly 36 is thereby adapted to receive the end seal welding electrode leading end portion 66 through the rear channel 90 thereof and extending therefrom into the intermediate chamber 94 thereof to the desired position adjacent to but spaced from the axial bore 18 of the end plug 16. Further, the insert 40 is thereby adapted to receive the flow of fill gas into the offset rear passageways 92 thereof from the middle orifice 84 of the end stop 38 for supplying the fill gas flow to the intermediate chamber 94 of the insert 40 past the leading electrode end 66 and both into the end plug axial bore 18 and outwardly through the grooves 88 in the insert 40 past the end plug 16 to the welding chamber 12. The flow of the gas through the grooves 88 also takes it past the girth weld 62 on the end plug 16 which tends to chill and hasten solidification of the same.

The drive mechanism 50 of the welding apparatus 10 for rotating the cladding tube 22 is positioned adjacent the housing access opening 54 outside the welding chamber 12. It is operable to receive, grip and rotate the tube 22 and thereby rotate the tube end and end plug within said welding chamber and therewith said end plug stop assembly which supports the end plug.

FIG. 10 schematically depicts the girth welding and end seal welding electrodes 44,48 of the respective welding assemblies 42,46 carrying out the girth and end seal welding operations on the top end plug 16 fitted on the fuel rod tube 22.

For attaching the top end plug 16 to the top end 20 of the cladding tube 22, first, the top end 20 of the cladding tube 22 with the top end plug 16 frictionally fitted thereon is inserted through the housing access opening 54 into the welding position in a welding chamber 12 of the housing 14 adjacent to the leading end portion 64 of the girth welding electrode 44 extending ninety degrees to the tube end 20 and end plug 16. This places the end plug 16 in supporting contact with the insert 40 of the rotatable stop assembly 36 disposed in the chamber 12 opposite from and axially aligned with the chamber access opening 54. While performing the girth and end seal welding operations, preferably the tube 22 is rotated by the drive mechanism 50 which in turn rotates the tube end 20 and end plug 16 within the welding chamber 12 and therewith the stop assembly 36 engaged with the end plug.

Preferably, first, the girth welding electrode 44 is operated in a known manner to form the girth weld 62 (FIG. 11) circumferentially joining the end plug 16 and top end 20 of the cladding tube 22. After completing the girth weld 62, the tube 22 is evacuated and then the flow of inert gas is introduced via the stop assembly 36 into the end plug axial bore 18 and into the welding chamber 16 to pressurize the chamber 12 and thereby the interior of the cladding tube 22. After the chamber 12 and cladding tube interior have been pressurized with inert gas, the end seal welding electrode 48 is operated to form the end seal weld 68 in the end plug axial bore 18 to close the same. Although, it is preferred that the girth welding operation is performed prior to the end seal welding operation, the end seal welding operation can be performed first or even concurrently with the girth welding operation.

Figure 11:
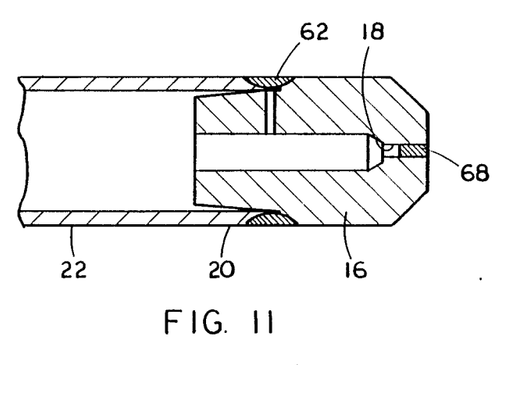
FIG. 11 is an enlarged fragmentary axial sectional view of the girth and end seal welded top end plug on the fuel rod tube.

FIG. 11 shows the girth and end seal welds 62,68 completed on the top end plug 16.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In an apparatus for welding an axial bore-bearing end plug on an end of a cladding tube, an end plug stop assembly comprising:
   (a) an end stop configured to receive an end seal welding electrode through a rear portion thereof and a flow of fill gas along the electrode through said rear portion; and
   (b) an end plug-engaging insert adapted to be removably received in a forward portion of said end stop, said insert being configured to receive a leading end portion of the end plug at a front portion of said insert and a leading end portion of the end seal welding electrode through a rear portion of said insert into a position for forming an end seal weld in the axial bore of the end plug when the latter is received in said forward portion of said insert, said insert also being configured to receive the flow of fill gas from said end stop into said rear and forward portions of said insert along and past the electrode leading end portion for filling a welding chamber containing said stop assembly and filling the cladding tube through the axial bore of the end plug prior to formation of the end seal therein.

2. The stop assembly as recited in claim 1, wherein said forward portion of said end stop has a forward cylindrical cavity open at a front end and said insert is of a diametric size relative to said diametric size of said forward cavity of said end stop which adapts said insert to fit within said end stop forward cavity.

3. The stop assembly as recited in claim 1, wherein said rear portion of said end stop has a rear central passage open at a rear end adapted to receive the electrode therethrough with the electrode leading end portion extending forwardly thereof.

4. The stop assembly as recited in claim 3, wherein said rear passage is larger in diameter than the electrode which adapts said rear passage to receive the flow of fill gas therethrough and along the electrode and into said rear portion of said insert.

5. The stop assembly as recited in claim 3, wherein said end stop has a middle orifice which communicates respectively with said rear passage and said forward portion of said end stop and is thereby adapted to receive the electrode leading end through and forwardly thereof and into said position in said rear portion of said insert for forming the end seal weld in the axial bore of the end plug when the latter is received in said forward portion of said insert.

6. The stop assembly as recited in claim 5, wherein said middle orifice of said end stop in communicating respectively with said rear passage and said forward portion of said end stop is thereby also adapted to receive fill gas flow from said rear passage for filling the welding chamber and the cladding tube through the axial bore of the end plug.

7. The stop assembly as recited in claim 1, wherein said forward portion of said insert has a forward recess open at a front end and configured to receive the leading end portion of the end plug therein.

8. The stop assembly as recited in claim 7, wherein said forward portion of said insert also has at least one forward groove open at a front end and extending along and opening into said forward recess and extending past the end plug leading end portion when received in said forward recess.

9. The stop assembly as recited in claim 8, wherein said rear portion of said insert has a rear axial channel open at a rear end adapted to receive the electrode leading end portion therethrough with a leading end of the electrode extending forwardly thereof to said position adjacent to but spaced from the axial bore of the end plug when received in said forward recess of said insert.

10. The stop assembly as recited in claim 9, wherein said rear portion of said insert also has at least one rear passageway open at a rear end and being offset radially from and extending along said rear axial channel, said rear passageway being adapted to receive the flow of fill gas from said end stop for supplying the fill gas flow past the electrode leading end portion and into the end plug axial bore and outwardly through said groove in said insert forward portion past the end plug to the welding chamber.

11. The stop assembly as recited in claim 10, wherein said insert further includes an intermediate chamber in a portion thereof located between said forward and rear portions, said chamber communicating respectively with said rear channel and passageway and said forward recess and groove, said intermediate chamber being smaller in diameter than the maximum diameter of said forward recess and larger in diameter than each of said rear channel and passageway.

12. In an apparatus for welding an axial bore-bearing end plug on an end of a cladding tube, an end plug stop assembly comprising:
   (a) an end stop having a forward cylindrical cavity open at a front end, a rear central passage open at a rear end, and a middle orifice which at its respective rear and front opposite ends communicates respectively with a front end of said rear passage and a rear end of said forward cavity, said middle orifice being larger in diameter than said rear passage and smaller in diameter than said forward cavity; and
   (b) an end plug-engaging insert being of a diametric size relative to said diametric size of said forward cavity of said end stop which adapts said insert to frictionally fit within said end stop cavity, said insert having a forward recess open at a front end and configured to receive a leading end portion of the end plug therein, a plurality of spaced apart forward grooves open at their front ends and extending along and opening into said forward recess and extending past the end plug leading end portion when received in said forward recess, a rear axial channel open at a rear end, a plurality of rear passageways open at their rear ends and being spaced circumferentially from one another and offset radially from and extending along said rear axial channel, and an intermediate chamber which at its respective rear and front opposite ends communicates respectively with front ends of said rear channel and passageways and rear ends of said forward recess and grooves, said intermediate chamber being smaller in diameter than the maximum diameter of said forward recess and larger in diameter than said rear channel and passageways;
   (c) said end stop thereby being adapted to receive an electrode through said rear passage thereof with a leading end portion of the electrode extending through and forwardly of said middle orifice of said end stop into a position for forming an end seal weld in the axial bore of the end plug when the latter is received in said forward recess of said insert, said end stop thereby also being adapted to receive a flow of fill gas through said rear passage thereof along the electrode and into said middle orifice of said end stop for filling a welding chamber containing said stop assembly and in filling the cladding tube through the axial bore of the end plug prior to formation of the end seal therein;

(d) said insert thereby being adapted to receive the electrode leading end portion through said rear channel and extending therefrom into said intermediate chamber of said insert to a position adjacent to but spaced from the axial bore of the end plug when received in said forward recess of said insert, said insert thereby also being adapted to receive the flow of fill gas into said offset rear passageways thereof from said middle orifice of said end stop for supplying the fill gas flow to said intermediate chamber of said insert past the leading electrode end and both into the end plug axial bore and outwardly through said grooves in said insert past the end plug to the welding chamber.

13. An apparatus for welding an axial bore-bearing end plug on an end of a cladding tube, said apparatus comprising:

(a) a stationary housing defining a welding chamber and an access opening at one end of said chamber to allow passage of the tube end fitted with the end plug therethrough to and from a welding position within said chamber;

(b) an end plug stop assembly rotatably mounted to said housing and disposed in said chamber opposite from and axially aligned with said chamber access opening, said stop assembly being adapted to engage a leading end portion of the end plug when inserted in said welding chamber;

(c) a girth welding assembly mounted on said housing and having an electrode with a leading end portion disposed within said welding chamber adjacent to the end plug and tube end and extending in generally orthogonal relation to the tube, said electrode being operable to form a girth weld circumferentially joining the end plug and end of the cladding tube;

(d) an end seal welding assembly mounted to said end plug stop assembly and having an electrode with a leading end portion disposed therethrough to a position located adjacent to and in axial alignment with the axial bore of the end plug, said electrode being operable to form an end seal weld therein, said end seal welding assembly also having means defining a path for flow of a fill gas along said electrode and both into said welding chamber and into the axial bore of the end plug before formation of the end seal weld therein; and (e) drive means being operable to rotate the tube and thereby rotate the tube end and end plug within said welding chamber and therewith said end plug stop assembly which supports the end plug.

14. The apparatus as recited in claim 13, wherein said end plug stop assembly includes:

an end stop configured to receive said end seal welding electrode through a rear portion thereof and a flow of fill gas along the electrode through said rear portion; and an end plug-engaging insert adapted to be removably received in a forward portion of said end stop, said insert being configured to receive the end plug leading end portion at a front portion of said insert and said end seal welding electrode leading end portion through a rear portion of said insert into said position for forming the end seal weld in the axial bore of the end plug when the latter is received in said forward portion of said insert, said insert also being configured to receive the flow of fill gas from said end stop into said rear and forward portions of said insert along and past the end seal welding electrode leading end portion for filling a welding chamber containing said stop assembly and filling the cladding tube through the axial bore of the end plug prior to formation of the end seal therein.

15. The apparatus as recited in claim 14, wherein said end stop has at said forward portion thereof a forward cylindrical cavity open at a front end, at said rear portion thereof a rear central passage open at a rear end, and at a middle portion thereof located between said forward and rear portions a middle orifice which at its respective rear and front opposite ends communicates respectively with a front end of said rear passage and a rear end of said forward cavity.

16. The apparatus as recited in claim 15, wherein said insert is of a diametric size relative to said diametric size of said forward cavity of said end stop to frictionally fit within said end stop cavity.

17. The apparatus as recited in claim 15, wherein said insert has at said forward portion a forward recess open at a front end and configured to receive the leading end portion of the end plug therein and a plurality of spaced apart forward grooves open at their front ends and extending along and opening into said forward recess and extending past the end plug leading end portion when received in said forward recess, at said rear portion a rear axial channel open at a rear end and a plurality of rear passageways open at their rear ends and being spaced circumferentially from one another and offset radially from and extending along said rear axial channel, and at an intermediate portion thereof located between said forward and rear portions an intermediate chamber which at its respective rear and front opposite ends communicates respectively with front ends of said rear channel and passageways and rear ends of said forward recess and grooves, said intermediate chamber being smaller in diameter than the maximum diameter of said forward recess and larger in diameter than said rear channel and passageways.

18. The apparatus as recited in claim 17, wherein said end stop in having such configuration is thereby adapted to receive said end seal welding electrode through said rear passage thereof with said electrode leading end portion extending through and forwardly of said middle orifice of said end stop into said position for forming the end seal weld in the axial bore of the end plug when the latter is received in said forward recess of said insert, said end stop thereby also being adapted to receive the flow of fill gas through said rear passage thereof along said end seal welding electrode and into said middle orifice of said end stop for filling said welding chamber and the cladding tube through the axial bore of the end plug prior to formation of the end seal therein.

19. The apparatus as recited in claim 18, wherein said insert in having such configuration is thereby adapted to receive said end seal welding electrode leading end portion through said rear channel and extending therefrom into said intermediate chamber of said insert to said position adjacent to but spaced from the axial bore of the end plug when received in said forward recess of said insert, said insert thereby also being adapted to receive the flow of fill gas into said offset rear passageways thereof from said middle orifice of said end stop for supplying the fill gas flow to said intermediate chamber of said insert past the leading electrode end and both into the end plug axial bore and outwardly through said grooves in said insert past the end plug to said welding chamber.

20. A method of welding an axial bore-bearing end plug on an end of a cladding tube, said method comprising the steps of:
 (a) inserting the end of the cladding tube with the end plug fitted thereon through an access opening in a housing and into a welding position in a welding chamber of the housing adjacent to a leading end portion of an girth welding electrode mounted on the housing and extending in generally orthogonal relation to the tube end and end plug;
 (b) placing the end plug in supporting contact with a rotatable stop assembly disposed in the chamber opposite from and axially aligned with the chamber access opening, mounting a leading end portion of an end seal welding electrode and defining pathways for flow of inert gas for filling the welding chamber and the cladding tube via the axial bore in the end plug;
 (c) rotating the tube and thereby the tube end and end plug within the welding chamber and therewith the stop assembly engaged with the end plug;
 (d) operating the girth welding electrode to form a girth weld circumferentially joining the end plug and end of the cladding tube;
 (e) introducing the flow of inert gas via the stop assembly into the end plug axial bore and into the welding chamber to pressurize the chamber and thereby the interior of the cladding tube; and
 (f) after the chamber and cladding tube interior have been pressurized with inert gas, operating the end seal welding electrode to form an end seal weld in the end plug axial bore to close the same.

21. The method as recited in claim 20, wherein step (e) is preferably performed after step (d).

* * * * *